United States Patent

[11] 3,603,459

| [72] | Inventor | Richard I. Erb |
| | | 910 Croton Drive, Alexandria, Va. 22308 |
| [21] | Appl. No. | 28,449 |
| [22] | Filed | Apr. 14, 1970 |
| [45] | Patented | Sept. 7, 1971 |

[54] ADJUSTABLE BICYCLE RACK
17 Claims, 10 Drawing Figs.

| [52] | U.S. Cl. | 211/20 |
| [51] | Int. Cl. | A47f 7/00 |
| [50] | Field of Search | 211/20, 21, 22, 24, 23 |

[56] References Cited
UNITED STATES PATENTS

| 581,585 | 4/1897 | Hirschman et al. | 211/21 |
| 592,086 | 10/1897 | Frambes | 211/21 |
| 614,432 | 11/1898 | Austin | 211/20 X |
| 2,323,846 | 7/1943 | Saltsman | 211/24 |
| 3,076,650 | 2/1963 | Richter | 211/22 X |

*Primary Examiner*—Nile C. Byers, Jr
*Attorney*—Thomas E. Beall, Jr.

ABSTRACT: One or more bicycles may be held in the bicycle rack with adjustments made as to differences in tire width, tire diameter, and space between adjacent bicycles. A pair of mirror image L-shaped supporting members is provided for each bicycle, with each supporting member extending vertically and having a plurality of horizontal holes receiving therein parallel supporting tubes. Releasable fasteners are provided to secure supporting members to the tubes in any adjusted position according to the dictates of the bicycle to be held. Each pair of L-shaped members has oppositely disposed inner bevelled surfaces and outer ribs for guiding a bicycle between them, which bicycle may roll up and over one of the tubes from either direction with the aid of ramp surfaces. The tubes are arranged to engage tread of the tire resting on the support surface and the L-shaped members are arcuate to engage the sidewalls of the tire for approximately 180° of its circumference. For further adjustability, cross pins are provided for smaller diameter tires.

INVENTOR
RICHARD I. ERB

BY *Thomas E. Beall, Jr.*
ATTORNEY

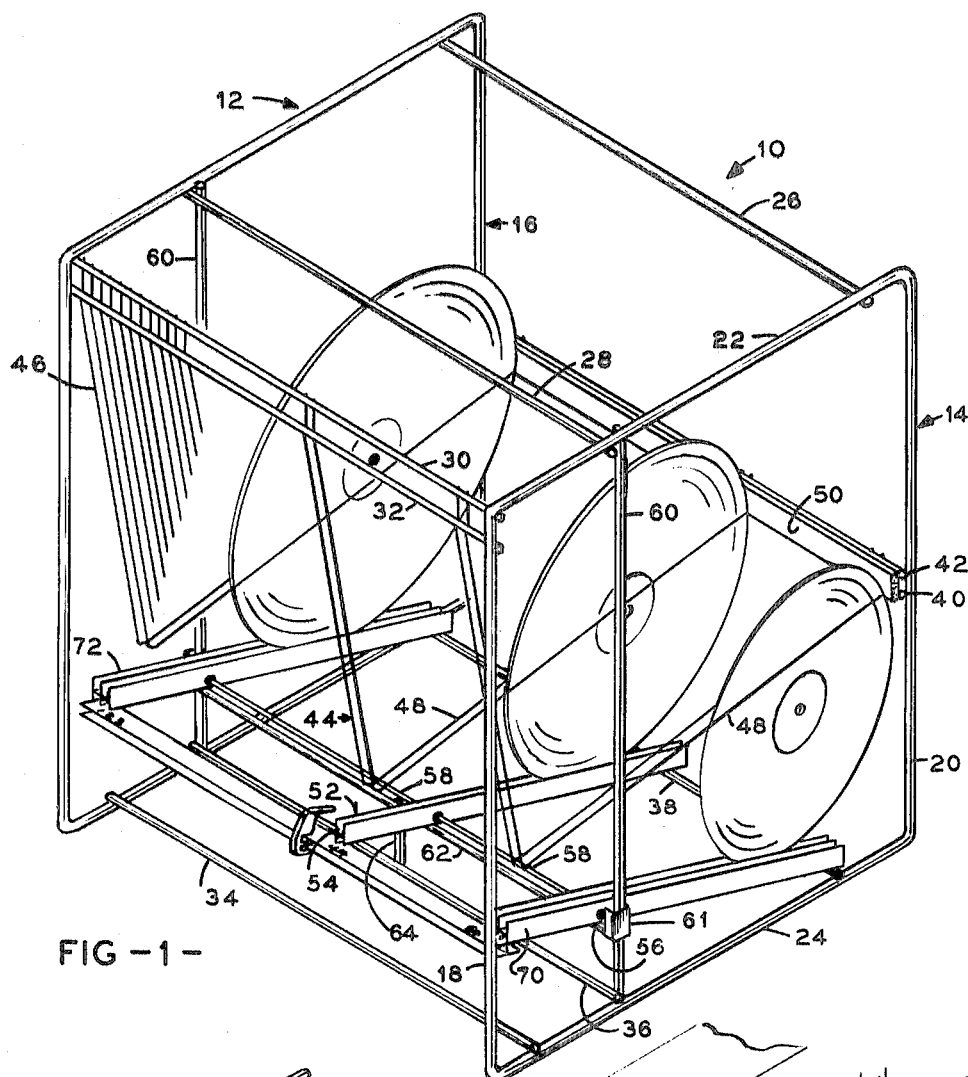
FIG-1-
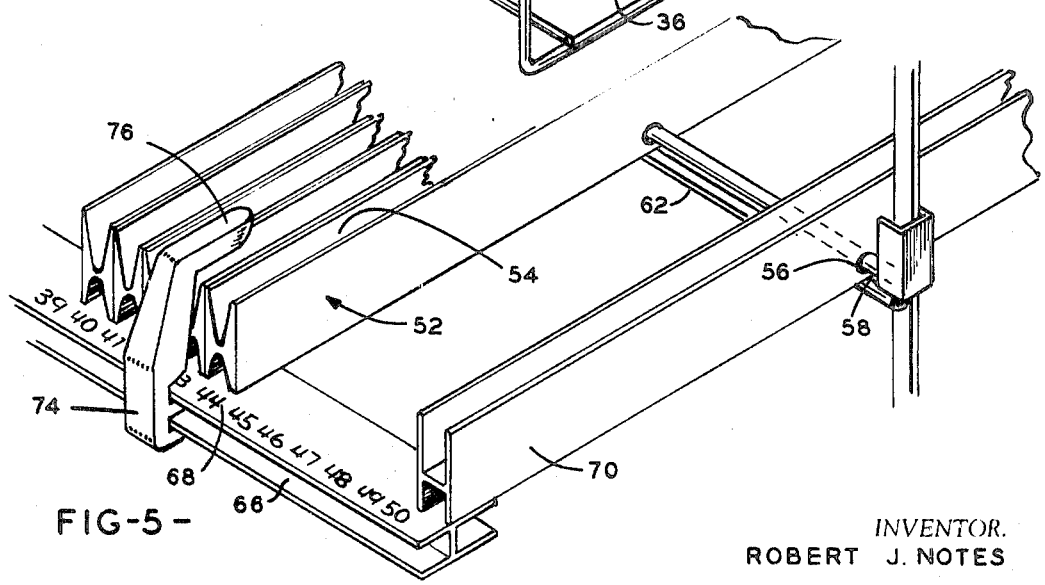
FIG-5-
INVENTOR.
ROBERT J. NOTES

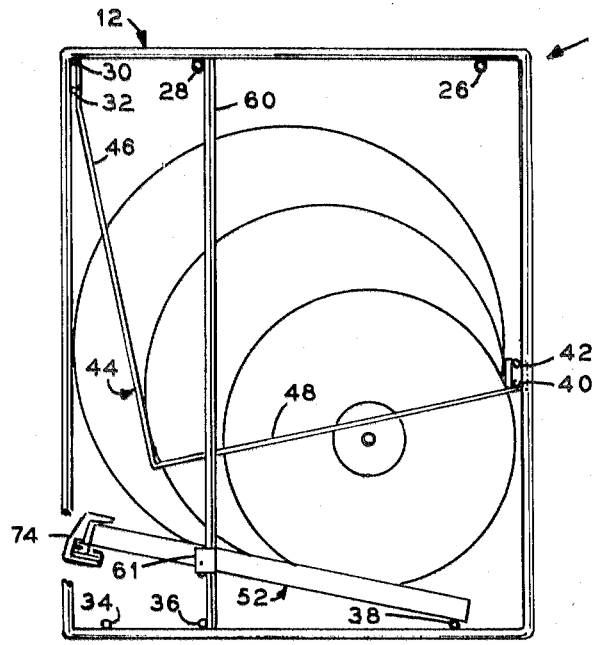
FIG.-2-
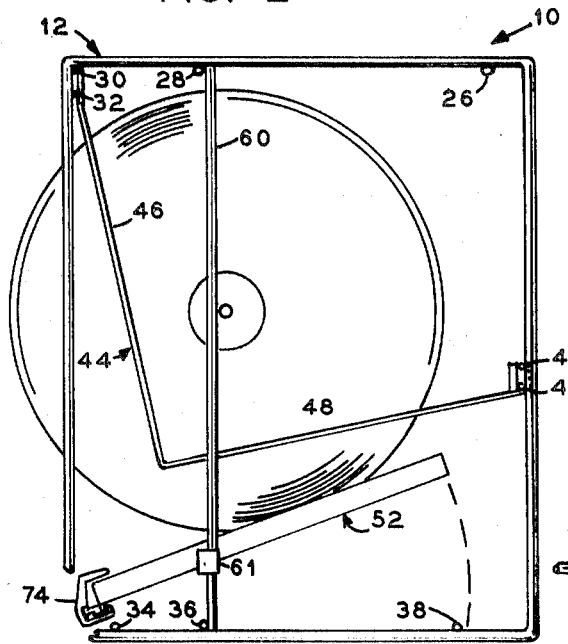
FIG.-3-
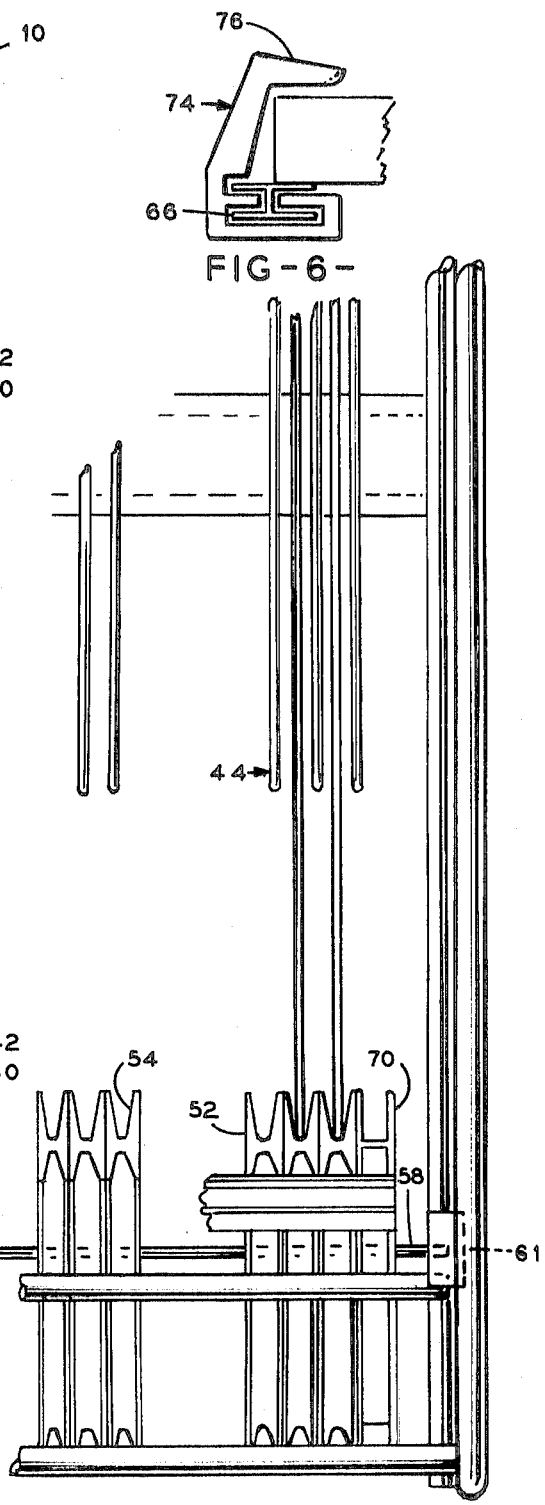
FIG-6-
FIG-4-
INVENTOR.
ROBERT J. NOTES
BY
Allen D. Gutchess, Jr
his atty

ADJUSTABLE BICYCLE RACK

BACKGROUND OF THE INVENTION

Numerous bicycle racks have been made in the past, but these have been unsuited for home use due to their complexity, size, weight and inflexibility with respect to accommodating different types of and different numbers of bicycles. With a large number of bicycles in daily use in storage in homes, there is a considerable demand for a bicycle rack that may be packaged in a small unit, assembled by the average homeowner, purchased for a small amount, and will accommodate a wide variety and number of bicycles.

SUMMARY OF THE INVENTION

It is an object of the present invention to provide a bicycle rack that will have sufficient flexibility to accommodate any number of bicycles desired, without excess capacity, will be inexpensive, easily assembled, may use some standardized and readily available parts, may be adjusted to accommodate tires of different diameter and width, as well as bicycles with variable handlebar widths. Also, the rack may be used for motorcycles, bicycles with training wheels, tricycles, scooters and unicycles. Further, it is an object to provide a bicycle rack that has considerable flexibility with respect to its securement to the ground, securement to a wall, or ability to be self-supporting. Further, it is an object to produce a bicycle rack wherein a bicycle may be driven into it and readily guided out while at the same time providing secure support for the bicycle in the rack.

These objects are accomplished with pairs of mirror image generally L-shaped vertically extending support members having three horizontally extending apertures for receiving therein respectively three standard size tubes. The L-shaped members may be releasably secured to the tubes with simple screw fasteners to provide any spacing between pairs of the accommodation of handlebars of adjacent bicycles, any spacing between the L-shaped members of each pair to accommodate varying tread widths, and to provide easy disassembly for moving or storage. Additional horizontally extending holes are provided for the reception of auxiliary pins for engaging the periphery of bicycle tires smaller than a predetermined maximum, for example, smaller than 26 inches; the tubes being mounted for engaging the periphery of a 26-inch bicycle resting on the same support surface as the rack.

The outer end of each horizontally extending leg of the L-shaped members is provided with a boss for reinforcing the hole receiving therein one of the tubes and for providing a ramp surface, in each direction, for guiding and supporting a bicycle tire rolling into or out of the bicycle rack, without placing undue stresses upon the adjacent tube. Once the bicycle tire rides up the ramp toward the rack, it is guided between the L-shaped members by outer upwardly extending ribs and inner downwardly bevelled surfaces. In this manner, a bicycle may even be ridden into the rack without dismounting.

The bicycle rack is adapted to be mounted on a wall or in the ground by stakes that are assembled with a snap action into circular channels that encompass the stakes for more than 180° of their circumference. The assembly of each stake into its channel is facilitated in the transverse direction, by double guide surfaces that will help to spread the walls of the channel apart as the stake enters. For this purpose, the L-shaped members are preferably constructed of molded plastic. Each of the stakes is provided with one pointed end for driving into the ground with a plurality of transversely extending holes for screwing to a wall or the like, after which screwing the channel may be snapped over the stake.

BRIEF DESCRIPTION OF THE DRAWING

Further objects, features and advantages of the present invention will become more clear from the following detailed description of a single preferred embodiment of the present invention, together with the accompanying drawing, in which.

DETAILED DESCRIPTION OF THE DRAWING

Figure 1:
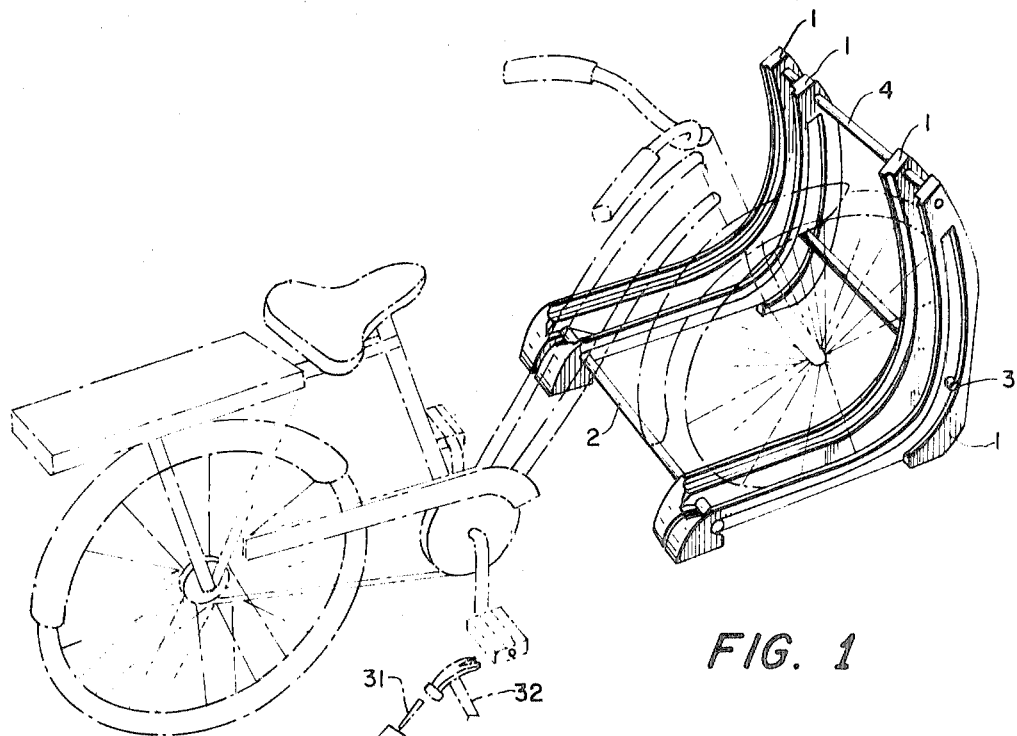
FIG. 1 is a perspective view of a bicycle rack showing the manner in which a bicycle is received therein.

As shown in FIG. 1, the bicycle rack employs a pair of substantially L-shaped supporting members 1, for each bicycle to be held. Two pairs of L-shaped members are shown in FIG. 1 for supporting two adjacent bicycles at the same time, although it is contemplated that one or any number of pairs may be employed as desired according to the number of bicycles desired to be held. Although only one bicycle is shown as being held in FIG. 1, it is understood that the adjacent pair of L-shaped members 1 are adapted to hold another bicycle at the same time. The L-shaped members 1 of each pair are held securely together by means of three horizontally extending bars, 2, 3, 4, which are preferably constructed of standard diameter metallic tubing, particularly aluminum. When more than one pair of L-shaped members are employed for mounting more than one bicycle, the same bars 2, 3, 4 are used to support all of the pairs, with the spacing between pairs also being adjustable.

Figure 2:
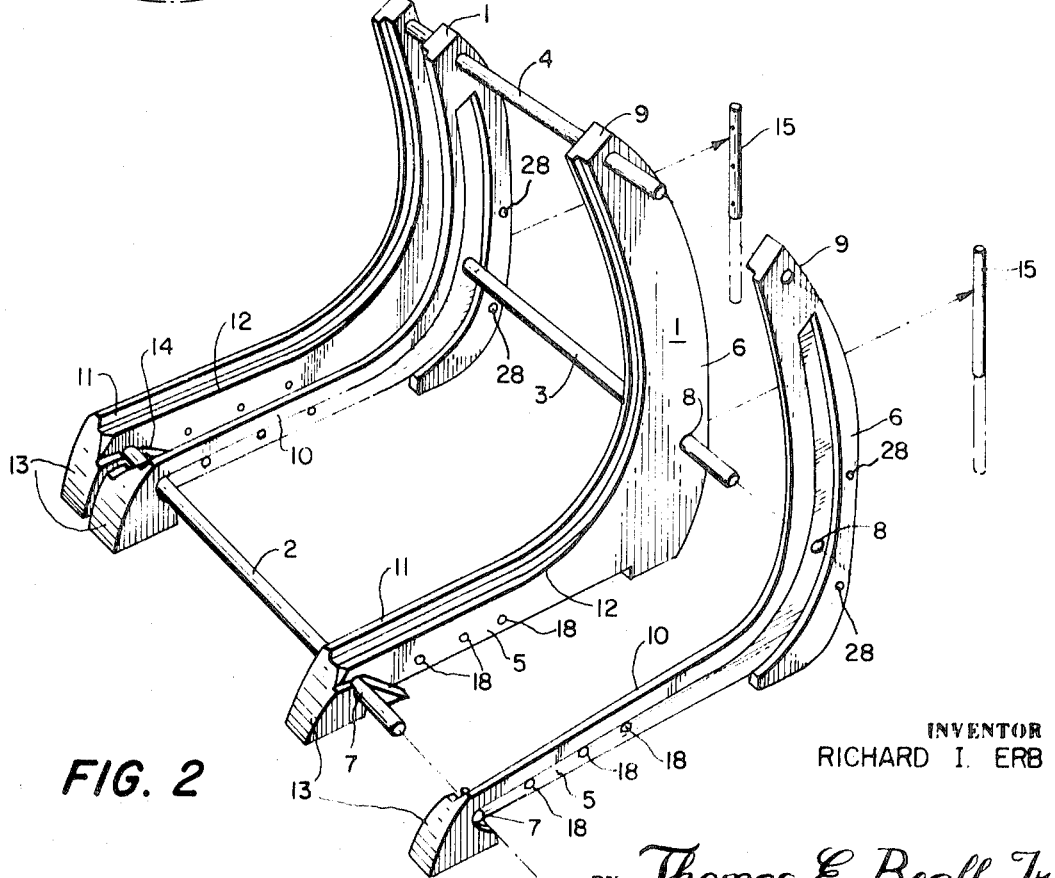
FIG. 2 is an enlarged and exploded view of the rack as shown in FIG. 1.

The L-shaped members are more clearly shown in FIG. 2. Although it is contemplated that the two L-shaped members of each pair may be identical for ease in manufacture, preferably the L-shaped members of each pair are mirror images of each other, for purposes that will become more apparent hereinafter. Each L-shaped member 1 includes a horizontally extending leg 5 and a vertically extending leg 6, which legs are integrally secured together at their adjacent inner ends, with a one-piece molded plastic construction of each L-shaped member being preferred. Horizontally extending circular holes 7, 8, 9 are respectively provided in each L-shaped member 1 for the reception of the bars 2, 3, 4, respectively.

The horizontally extending legs 5 of each pair are provided with oppositely disposed outer ribs 10, 11 that extend vertically upwardly for their full length and preferably also along the full length of the vertically extending legs 6, although this is not necessary. The ribs 10 and 11 will help to guide the bicycle tire inwardly and prevent it from falling outwardly when it is moved offcenter onto the bicycle rack. To further aid in moving the bicycle tire to its proper position between the L-shaped members of its associated pair, the opposed inner edges of the horizontally extending legs of each pair are bevelled downwardly and inwardly at 12. Thus, it is seen that if a bicycle tire is moved onto a horizontally extending leg considerably offset from the center line of the pair, it will be engaged by a rib 10 or 11, and if it is only slightly offset, it will be guided by the bevelled edge 12 to where it will drop between adjacent horizontally extending legs 5 of the pair.

To prevent a considerable jolt from occuring in riding a bicycle into the rack upon hitting the bar 2, each of the horizontally extending legs is provided with an inwardly extending boss or projection surrounding the bar 2, with a forwardly oriented ramp surface 13 and a rearwardly extending ramp surface 14. These ramp surfaces are more clearly shown in FIG. 3, particularly with respect to the manner in which they will engage a bicycle wheel and guide it upwardly and over the bar 2, from either direction.

Bars, preferably stakes, 15 are releasably secured to the rearwardly facing edge of each, or only one L-shaped member of each pair for rigidly securing the bicycle rack to the ground, a wall or the like.

Figure 3:
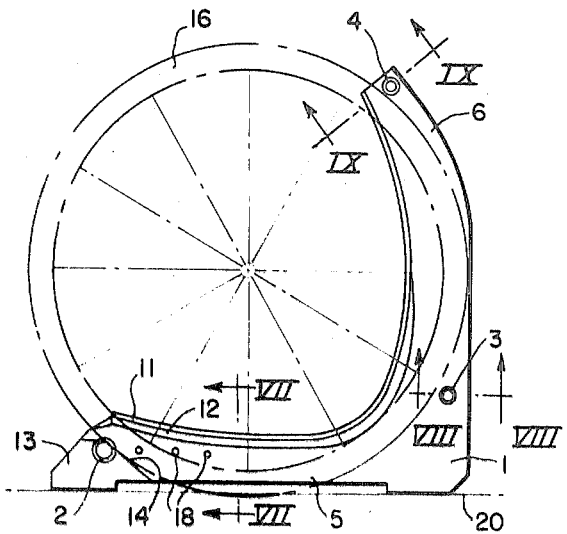
FIG. 3 is a side elevation view of one of the L-shaped supporting members, with the tire engaging surface forward, showing the manner in which the rack supports a bicycle wheel of the largest contemplated diameter.
Figure 4:
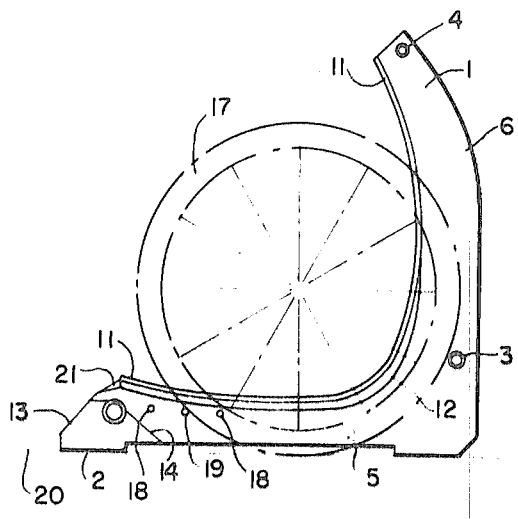
FIG. 4 is a side elevation view the same as FIG. 3, but showing the manner in which an additional cross pin may be assembled for supporting a bicycle wheel smaller in diameter than the bicycle wheel shown in FIG. 3.
Figure 5:
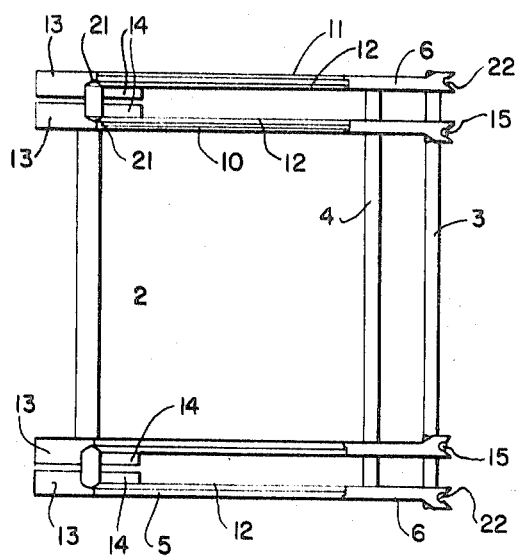
FIG. 5 is a top plan view of the bicycle rack shown in FIG. 1.

From FIG. 3, it is seen that the bars 2, 3, 4 are arranged such that at least two and preferably all of them, will engage the periphery of the bicycle tire 16, which bicycle tire 16 has the maximum contemplated standard diameter, for example, 26 inches. When it is desired to insert a bicycle having a smaller diameter wheel 17 into the rack, a pair of cross holes 18 in the adjacent horizontally extending legs 5 of each pair will receive a cross pin 19 as shown in FIG. 4 so that the pin 19 and the bar 3 will engage the periphery of the tire 17 as it rests upon the support surface 20 that supports the bicycle rack. As a specific example, the wheel 17 would be a 20-inch diameter wheel. Additional holes 18 may be appropriately provided in the horizontally extending legs 5 for receiving the pin 19 at positions corresponding to bicycle wheels having diameters of 24 inches, 18 inches, or any other standard size. In this manner, the bicycle rack is constructed so that the main weight of the bicycle, for example with a person sitting upon it, will be carried by the support surface 20, for example the ground, while the bars 2 and 3 or the pin 19 and bar 3 will engage the front and back tread surface of the tire to prevent it from rolling either forward or backward. This is particularly important when it is realized that many children wish to sit upon a bicycle when it is carried within a rack.

FIGS. 3 and 4 also show more clearly the bevelled edge 12, which is shown as extending from approximately the midpoint of vertically extending leg 6 downwardly across the upper inner edge of horizontally extending leg 5. A front bevelled surface 21 is provided adjacent the forward or outer end of the bevel edge 12, to further assist in guiding the bicycle wheel properly between adjacent L-shaped members 1 of its associated pair. If desired, the bevelled edge 12 could extend for the full length of the vertically extending leg 6 or only for the full length of the horizontally extending leg 5.

Figure 6:
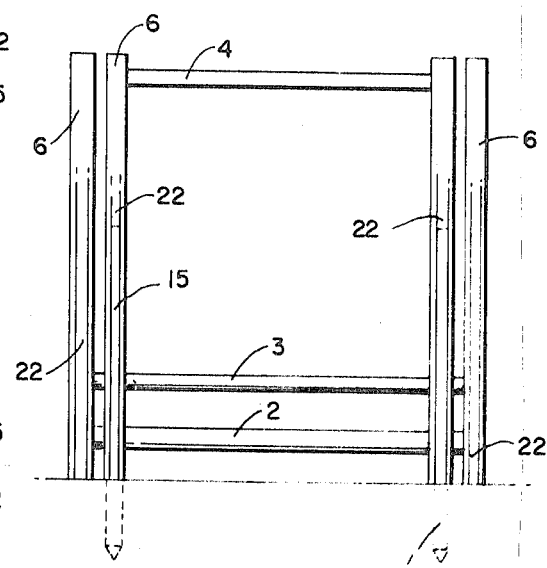
FIG. 6 is a rear elevation view of the bicycle rack, showing the mounting stakes.
Figure 7:
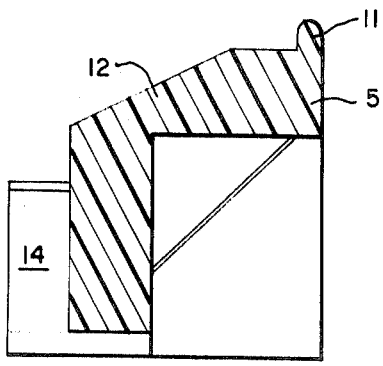
FIG. 7 is a cross-sectional view taken along line VII—VII of FIG. 3.
Figure 10:
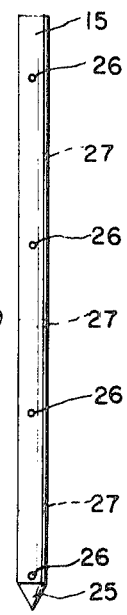
FIG. 10 is a side elevation view of one of the mounting stakes to be employed in securing the bicycle rack either to a wall or to the ground.

The bicycle rack may be secured to the ground on a wall with a structure specifically shown in FIGS. 5, 6, 8 and 10. It is understood that a bicycle rack in FIG. 1 is sufficiently rigid to be self-supporting without requiring this securement, although the securement is advantageous, and is necessary with respect to a bicycle rack employing only a single pair of L-shaped members for mounting only a single bicycle. The rearwardly facing edge of each vertically extending leg 6 is provided with a rearwardly opening channel, which is arcuate for more than 180° as most clearly shown in FIG. 8. The stake 15 of FIG. 10 is preferably cylindrical for reception in the correspondingly shaped channel 22. The vertically extending leg 6 is constructed of molded plastic so that with the aid of bevelled cam or guide surfaces 23, 24, the stake 15 may be pushed transversely into the channel 22 with the cam surfaces 23, 24 assisting in spreading the legs of the channel 22 apart for the reception of the stake 15, with the legs thereafter snapping back around the stake 15 for securely holding it therein. As shown in FIG. 10, the stake 15 is provided with an almost pointed end 25 to assist in driving the stake in the ground as shown in FIGS. 2 and 6. Also, the stake 15 is provided with a plurality of transversely extending bores 26 that may be used to receive wood screws or the like that may be driven into a supporting wall, fence, or the like. In this manner, the stake 15 may be mounted securely either in the ground or on a vertically extending surface such as a wall. In either event, thereafter the vertically extending leg 6 is pushed toward the stake so that its channel 22 will receive therein the stake 15. To further assure a releasable rigid connection between the stake 15 and the vertically extending leg 6, a plurality of holes 27 are provided at least partially into the stake 15 for the reception of a sheet metal or wood screw 28, which first passes through a preformed hole 29 in the leg 6.

With the above structure, versatility of mounting is seen. Only one channel 22 for each leg pair may be used for receiving a stake 15, as shown in FIG. 6, or both of the channels 22 may be used to obtain a particularly strong securement of the bicycle rack. Although each stake is long enough to be driven within the ground and received substantially for the full length of its associated channel 22, the stake 15 will not extend above the vertically extending leg 6 even when it is mounted on a wall with its pointed end 25 resting on a support surface 20. However, a portion of the stake may be cut off by the user if desired when mounted upon a wall.

Figure 8:
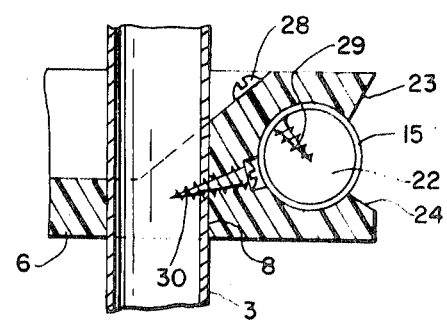
FIG. 8 is a cross-sectional view taken along line VIII—VIII of FIG. 3.
Figure 9:
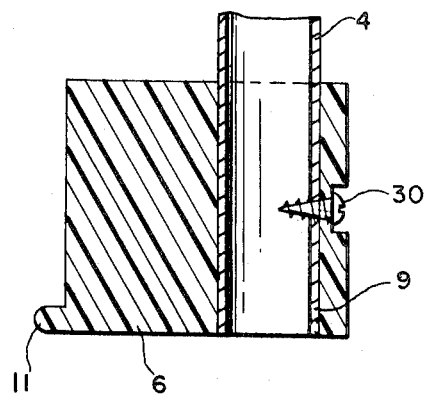
FIG. 9 is a cross-sectional view taken along line IX—IX of FIG. 3.

As shown in FIGS. 8 and 9, the bars 3 and 4 are respectively secured within their holes 8 and 9 by means of sheet metal screws 30 that are passed through preformed holes in their respective legs and then screwed into their respective tubes.

OPERATION

Preferably, the bicycle rack of the present invention will be sold as a packaged unit, with each package containing a mating pair of L-shaped members 1, one or two stakes 15, a plurality of screws 29, 30, which are preferably identical, a cross pin 19 only slightly longer than the combined width of the L-shaped members 1, and a suitable punch similar to a number 16 common nail. It is contemplated that the packaged unit will be sold in a store that normally carries standard diameter aluminum tubing. Therefore, the purchaser would buy a package for each bicycle to be secured to his rack and a sufficient length of tubing, as determined by a table preferably printed upon the package, with which to make the bars 2, 3, 4.

The tubes 2, 3, 4 are assembled with the L-shaped members 1 loosely as shown in FIG. 2. One of the outermost L-shaped members 1 is arranged with respect to the tubes 2, 3, 4 so that the ends of the tubes 2, 3, 4 are flush with the outer side of the L-shaped member. Thereafter, the punch 31 is placed in each of the preformed holes to engage successively the tubes 2, 3 4 and struck with a hammer 32 until a hole is punched in the adjacent wall of the respective tube. Thereafter, the punch is withdrawn and a screw 30 is assembled in the thus punched hole.

Next, the front wheel of a bicycle that is to be associated with the pair of L-shaped members having the rigidly secured member is placed between the members of the pair, and the unsecured member of the pair is pushed tightly toward the rigidly secured member to tightly clamp the tire therebetween regardless of the tire width. Thereafter, the aforementioned procedure involving the punch 31 and hammer 32 is repeated for the second member of the pair so that screws 30 may be driven into the tubes 2, 3, 4 for rigidly securing the second member of the pair.

The next bicycle that is to be mounted in the rack is loosely positioned between the pair of L-shaped members adjacent the secured pair and the spacing between pairs is adjusted to allow sufficient room for the handlebars of the adjacent bikes, which handlebar spacing will vary according to the particular bicycles employed. Thus, it is seen that the bicycle rack is individually tailored to the bicycles to be carried thereby. After this handlebar width adjustment, the L-shaped member of the second pair that is closest to the secured pair is secured to the tubes 2, 3, 4 with the repeat of the above procedure involving the punch 31, hammer 32 and screws 30. Thereafter, the unsecured L-shaped member of the second pair is pushed toward the secured member of its pair to tightly clamp therebetween the bicycle to be associated with this pair. As before, the second L-shaped member of the second pair is rigidly secured to the tubes 2, 3, 4 with the punch 31, hammer 32 and screws 30.

The above process may be repeated for as many bicycles as the rack is designed to hold.

From the foregoing, it is seen that a minimum number of parts is employed in a single package to be sold to the average homeowner for constructing a bicycle rack with otherwise standardized parts, with a minimum amount of cutting. If the homeowner is not equipped to cut the tubing, the tubes may be precut according to a chart at the supply store and assembled with standard spacing between pairs, rather than the above described individualized spacing between pairs for accommodation of different handlebar widths. In any event, the assembly procedure is simple enough that only a hammer and screwdriver is required to rigidly secure the individual L-shaped members to the tubes 2, 3, 4 with the spacing between L-shaped members of each pair to accommodate the particular bike associated therewith. It is thus seen that whether the bicycle is a thin-walled racing-type bicycle or a balloon-tired bicycle, the pair of L-shaped members associated therewith will be rigidly secured to the tubes 2, 3, 4 in an adjusted position individualized so that the sidewalls of the tire will be tightly clamped. Further, the bicycle tire will be prevented from moving forward and rearward by means of the spacing of the tubes 2, 3, 4 so that will engage the periphery of the tire or due to the insertion of a cross pin 19 in the case of a tire having a diameter smaller than the maximum contemplated diameter.

From FIGS. 3 and 4 it is seen that the vertically extending leg 6 curves inwardly back toward the horizontally extending leg 5 for a distance sufficient to engage the largest diameter bicycle wheel over approximately 180° of its circumference. From FIG. 4, it is seen that even a smaller diameter wheel will be engaged for approximately 180° of its circumference.

Movement of the bicycle into the rack is facilitated by means of the ramp surface 13, movement of the bicycle out of the rack is facilitated by the ramp surface 14, and centering of the wheel during movement of the bicycle into the rack is facilitated by means of the ribs 10, 11 the bevelled edge 12 and the bevel surface 21.

Preferably, the L-shaped members are constructed in one piece of molded plastic with suitable reinforcing ribs and the like. However, it is contemplated that according to the broader aspects of the present invention other materials may be used. Further, if desired, the tubes 2, 3, 4 may be of the same diameter and even the stake 15 may be constructed of this same diameter tubing. If tubing is not available, solid hardwood dowels could be substituted. However, it is preferred to provide the particular stake of FIG. 10 for the advantages of the preformed bores and holes 26, 27 and pointed end 25.

Due to the adjustable spacing between the L-shaped members, it is possible to tightly clamp the sidewalls of a bicycle tire and due to the provision of the tubes 2, 3, 4 and the cross pin 19, the tire will be held from moving forward and backward so that a child may sit upon the bicycle and play while it is within the rack without danger of tipping over or breaking the rack, which rigid securement is further enhanced by engaging the tire around approximately 180° of its circumference. This feature also designed to prevent permanent deformation of the bicycle wheel as a result of lateral loads on the bicycle. The guiding of the tire into the rack is efficient enough that with models actually constructed, a child has been able to ride the bicycle into the rack without dismounting. Bicycle racks employing one, two or more pairs of L-shaped members have been constructed with great success due to the versatility of construction and mountings upon walls or in the grounds. These have proved quite rigid. Even a bicycle rack as shown in FIG. 1 without any stakes 15 being employed is sufficiently rigid to withstand considerable abuse from children and their bicycles.

While a preferred embodiment has been specifically illustrated and described with respect to its structure and method of construction, further embodiments, variations and modifications are contemplated within the broader aspects of the present invention.

What is claimed is:

1. An adjustable bicycle rack, comprising: at least two elongated bars; at least two rigid, generally L-shaped support members; each of said support members being constructed of one piece having a first leg with an outer leg and an inner end, and a second leg with an outer end and an inner end integrally secured to said first leg inner end; said first legs having aligned first apertures for horizontally receiving therein one of said bars; said second legs having aligned second apertures for receiving therein the other of said bars; and releasable fastener means constituting the only means limiting horizontal movement between said members and bars, and said fastener means each being at least partially within a respective aperture and only directed between a respective member and bar for rigidly securing its leg to a respective bar at an adjusted spacing corresponding to the sidewall to sidewall width dimension of any cycle tire to be received therebetween.

2. The device of claim 1, wherein each of said second legs extends arcuately to form means with said first legs to grip a cycle wheel tightly on each side for substantially 180° of its circumference.

3. The device of claim 1, wherein said support members have aligned third apertures adjacent their leg inner ends for receiving therein a third bar; and all of said apertures being so related that bars received therein will be parallel.

4. The device of claim 1, wherein said releasable fastener means includes screws extending through said legs and substantially radially into said apertures.

5. The device of claim 1, including two additional substantially L-shaped members respectively identical to said first-mentioned members; and additional fastener means for mounting said last-mentioned L-shaped members on the same bars with said last-mentioned members at an adjustable spacing with respect to said first-mentioned L-shaped members and themselves to accommodate the variable spacing between different cycle, handlebars, and tires, respectively.

6. The device of claim 1, wherein all of said apertures are cylindrical and of the same diameter; and including metallic tubes of the same diameter extending through respective aligned apertures to constitute the bars.

7. A device for use in constructing an adjustable cycle rack with elongated bars, comprising: at least two rigid, generally L-shaped support members; each of said support members having a first leg with an outer end and an inner end, and a second leg with an outer end and an inner end rigidly secured to said first leg inner end; said first legs having aligned first apertures for horizontally receiving therein a bar; said second legs having aligned apertures for receiving therein another parallel bar; releasable fastener means for rigidly securing each of said legs to a respective bar; and said first legs having bevelled surfaces for facing each other to form guide means for directing a tire thereon downwardly and between adjacent horizontal legs, when assembled with the bars.

8. A device for use in constructing an adjustable cycle rack with elongated bars, comprising: at least two rigid, generally L-shaped support members; each of said support members having a first leg with an outer end and an inner end, and a second leg with an outer end and an inner end rigidly secured to said first leg inner end; said first legs having aligned first apertures for horizontally receiving therein a bar; said second legs having aligned second apertures for receiving therein another parallel bar; releasable fastener means for rigidly securing each of said legs to a respective bar; each of said first legs having an upper ramp surface means at its outer end for guiding a cycle tire upwardly and over a bar held in said first apertures; and said ramp means extending toward each other for adjacent first legs assembled with bars to at least a spacing therebetween substantially less than the normal spacing between adjacent horizontal legs that would correspond to the tire width.

9. The device of claim 8, wherein said ramp means extend downwardly toward the inner and outer ends from above the associated first apertures to guide a cycle tire upwardly and over a bar within said first apertures in either direction.

10. A device for use in constructing an adjustable cycle rack with elongated bars, comprising: at least two rigid, generally L-shaped support members; each of said support members having a first leg with an outer end and an inner end, and a second leg with an outer end and an inner end rigidly secured to said first leg inner end; said first legs having aligned first apertures for horizontally receiving therein a bar; said second legs having aligned second apertures for receiving therein another parallel bar; releasable fastener means for rigidly securing each of said legs to a respective bar; and each of said second legs including a channel means opening away from said first legs for receiving therein a mounting bar.

11. The device of claim 10, wherein said channel means is arcuate in transverse cross section and extends peripherally for more than 180°; and a mounting bar having a circular cross section, a point at its lower end for driving in the ground and a plurality of diametrically extending holes for receiving therein screws to be threaded into a wall.

12. The device of claim 11, wherein each of said support members is constructed in one piece of plastic; and said channel means constituting a resilient snap channel means for receiving said mounting bar transversely pushed therein.

13. A device for use in constructing an adjustable cycle rack with elongated bars, comprising: at least two rigid, generally L-shaped support members; each of said support members having a first leg with an outer end and an inner end, and a second leg with an outer end and an inner end rigidly secured to said first leg inner end; said first legs having aligned first apertures for horizontally receiving therein a bar; said second legs having aligned second apertures for receiving therein another parallel bar; releasable fastener means for rigidly securing each of said legs to a respective bar; said support members have aligned third apertures adjacent their leg inner ends for receiving therein a third bar; all of said apertures being so related that bars received therein will be parallel; said first, second and third apertures are related such that they will be closely adjacent to a 26-inch diameter tire resting on a planar surface horizontally supporting said first legs with said second legs extending vertically; and said first legs having aligned fourth apertures spaced inwardly from said first apertures to form means for receiving therein a horizontally extending pin to support the outer portion of a tire smaller than 26 inches and resting on the planar surface.

14. A device for use in constructing an adjustable cycle rack with elongated bars, comprising: at least two rigid, generally L-shaped support members; each of said support members having a first leg with an outer end and an inner end, and a second leg with an outer end and an inner end rigidly secured to said first leg inner end; said first legs having aligned first apertures for horizontally receiving therein a bar; said second legs having aligned second apertures for receiving therein another parallel bar; releasable fastener means for rigidly securing each of said legs to a respective bar; and each of said first legs including an upwardly extending rib running from its outer end toward its respective second leg for a substantial portion of its length on the side opposite from the adjacent first leg to form means for preventing a tire rolling on its upper surface from falling away from the adjacent first leg, when said support members are assembled with horizontal bars.

15. The method of assembling a cycle rack from two separate tire-engaging members, each having a plurality of transversely extending apertures arranged in aligned pairs with the other member, comprising assembling a separate horizontal bar through the aligned apertures of each pair, with the members extending generally in respective vertical planes; rigidly securing a first one of the assembled members to each horizontally extending bar; placing a cycle wheel in an upright position between the rigidly secured member and an adjacent assembled member; pushing the adjacent member toward the secured member to tightly clamp therebetween the cycle wheel; and thereafter, rigidly securing the adjacent member to each of the bars in the clamping position.

16. The method according to claim 15, including the subsequent steps of: loosely assembling two additional members on the same bars; placing an additional cycle in an upright position with one of its tires between the additional members; adjusting the additional members and the additional cycle horizontally along the bars to allow sufficient space between the cycles for their handlebars; thereafter, rigidly securing one of the additional members to each of the bars in its adjusted position adjacent the associated tire; thereafter, adjusting the other of the additional members to tightly clamp the tire of the additional cycle between the additional members; and rigidly securing, in clamping position, the other of the additional members to each of the bars.

17. The method of claim 16, wherein the steps of rigidly securing include forming a hole in each bar within each aperture through a preformed passage in the respective member and thereafter screwing a sheet metal screw through the preformed passage and into the thus formed hole in each bar.